US010068357B2

(12) United States Patent
Cox et al.

(10) Patent No.: US 10,068,357 B2
(45) Date of Patent: Sep. 4, 2018

(54) GRAPHICAL EVALUATION OF A COGNITIVE ANALYSIS USING A 3D SWIVEL BAR CHART

(71) Applicant: International Business Machines Corporation, Armonk, NY (US)

(72) Inventors: Aaron R. Cox, Tucson, AZ (US); Blake J. Fox, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/278,026

(22) Filed: Sep. 28, 2016

(65) Prior Publication Data

US 2018/0089866 A1 Mar. 29, 2018

(51) Int. Cl.
| | |
|---|---|
| G06T 15/00 | (2011.01) |
| G06T 11/20 | (2006.01) |
| G06F 3/0484 | (2013.01) |
| G06F 3/0481 | (2013.01) |
| G06F 17/28 | (2006.01) |
| G06F 17/30 | (2006.01) |

(52) U.S. Cl.
CPC ........ *G06T 11/206* (2013.01); *G06F 3/04815* (2013.01); *G06F 3/04845* (2013.01); *G06F 17/2872* (2013.01); *G06F 17/30572* (2013.01)

(58) Field of Classification Search
CPC ............................ G06T 19/20; G06F 3/04815
USPC ........................................................ 345/419
See application file for complete search history.

(56) References Cited

U.S. PATENT DOCUMENTS 6,707,454 B1   3/2004   Barg et al.
7,324,109 B2 *  1/2008   Palmer ................. G06F 17/211
                                                         345/440

(Continued)

FOREIGN PATENT DOCUMENTS

EP            1657660 A2      5/2006

OTHER PUBLICATIONS

S. Thakur and A. Hanson, "A 3d visualization of multiple time series on maps", in Information Visualisation (IV), 2010 14th International Conference, Jul. 2010, pp. 336-343.*

(Continued)

*Primary Examiner* — Phu K Nguyen
(74) *Attorney, Agent, or Firm* — Diana R. Gerhardt; Jack V. Musgrove (57) ABSTRACT

A 3D swivel bar chart has primary bars with associated secondary bars shown in a condensed form, such as along the z-axis hidden behind a corresponding primary bar. When a primary bar is selected, associated secondary bars swivel out from the z-axis to the front plane. When deselected, the secondary bars swivel back to the z-axis. The user can see additional information is tied to a bar without cluttering the presentation. For an application involving evaluation of a cognitive system, the primary bars can represent confidence levels for candidate answers to a natural language question. The chart includes a legend which displays a particular result when the corresponding primary bar is selected. When a label in the legend is selected, the visualization is augmented with explanatory information pertaining to the particular result, such as evidence extracted from corpora used by the cognitive system to arrive at the result.

20 Claims, 7 Drawing Sheets

(56) References Cited

U.S. PATENT DOCUMENTS

| | | | |
|---|---|---|---|
| 7,714,876 B1 * | 5/2010 | Hao | G06F 9/4443 |
| | | | 345/440 |
| 7,921,363 B1 | 4/2011 | Hao et al. | |
| 8,024,651 B1 | 9/2011 | Error | |
| 8,314,793 B2 * | 11/2012 | Beckman | G06T 11/206 |
| | | | 345/420 |
| 8,411,085 B2 * | 4/2013 | Rubin | G06T 19/00 |
| | | | 345/419 |
| 8,866,818 B2 * | 10/2014 | Rubin | G06T 11/206 |
| | | | 345/440 |
| 8,900,850 B2 | 12/2014 | Lane et al. | |
| 9,047,705 B1 | 6/2015 | Ko | |
| 9,135,331 B2 | 9/2015 | Rosenthal et al. | |
| 9,152,695 B2 | 10/2015 | Tibrewal et al. | |
| 9,330,503 B2 * | 5/2016 | Mital | G06F 3/04815 |
| 9,563,694 B2 | 2/2017 | Konchitsky et al. | |
| 2003/0128212 A1 | 7/2003 | Pitkow | |
| 2012/0079431 A1 | 3/2012 | Toso | |
| 2015/0170384 A1 | 6/2015 | Matsumoto et al. | |
| 2015/0339835 A1 | 11/2015 | Mohr et al. | |

OTHER PUBLICATIONS

Games, Peter, et al., "Visualization of off-screen data on tablets using context-providing bar graphs and scatter plots", Boise State University Theses and Dissertations, paper 626 (2013).
Freiler, Wolfgang, et al., "Interactive Visual Analysis of Set-Typed Data." IEEE Transactions on Visualization and Computer Graphics v. 14, n. 6, pp. 1340-1347 (2008).
KEIM, Daniel, et al., "Hierarchical Pixel Bar Charts" IEEE Transactions on Visualization and Computer Graphics v. 8, n. 3, pp. 255-269 (2002).

* cited by examiner

GRAPHICAL EVALUATION OF A COGNITIVE ANALYSIS USING A 3D SWIVEL BAR CHART

CROSS-REFERENCE TO RELATED APPLICATION

This application is related to U.S. patent application Ser. No. 15/278,024 entitled "SWIVEL BAR CONCEPT WITHIN A 3D SPACE TO INVITE USERS TO EXPLORE ADDITIONAL DATA ON A THIRD AXIS" filed concurrently herewith, which is hereby incorporated.

BACKGROUND OF THE INVENTION

Field of the Invention

The present invention generally relates to graphical user interfaces, and more particularly to a method of displaying information with a visual aid such as a bar chart.

Description of the Related Art

Diagrams and charts of various sorts are used in a wide variety of applications such as business presentations, scientific analysis, and industrial control equipment. Some of the most commonly used charts include line charts, pie charts, and bar charts. Bar charts typically use vertically-disposed bars or columns of varying height to represent discrete quantities which are the subject of the chart, but bar charts can be horizontal as well. A bar chart can include a vertical (y) axis with graduation marks or other units of measurement to indicate a scale, usually at the left side of the chart. Labels above each bar or below the horizontal (x) axis indicate the particular feature that a data value is associated with. Histograms are similar to bar charts but histograms are used to show distributions of variables while bar charts are used to compare variables.

While the earliest bar charts were in printed form (i.e., hard copy), charts and graphs can also be generated electronically, e.g., using a computer system and appropriate graphics software, shown on a display device such as a cathode-ray tube or liquid crystal display, or viewed with the assistance of a projector. The simplest bar charts are two dimensional (2D), but they can also be three dimensional (3D), that is, still seen on a 2D surface but having a representation which includes a third or depth (z) axis. In a 3D bar graph the bars are typically shown as blocks generally having the same width and depth but with varying heights. Color coding can also be employed with bar charts, i.e., bars have different colors or graphic schemes to represent certain characteristics or groupings. Other visual features can be used in conjunction with bar charts such as textures, shading, gradients, dashes, picture-like images, beveling, reflections, glow, etc.

Many graphics programs can automatically generate a chart, including bar charts, using preset templates. The chart creator selects a desired template and fills in various fields (title, categories, series, quantities, colors, etc.) for that template, and the software draws the corresponding chart details; the software may provide additional information that was inferred from but not directly provided by the user input, such as the scale for graduation marks along a vertical axis. Some graphics programs allow the presenter or user to focus or drill-down on a bar graph. Focus is a simple matter of moving the chart in a certain direction or changing its scale along one or more dimensions. Changing focus can be accomplished using various computer tools such as keyboard commands, a graphical pointing device (e.g., mouse) or touchscreen responsive to swipes or other finger gestures. Drill-down (or drill-in) is the ability to inspect further details about a particular feature of a chart. For example, a user could drill-down into a bar chart showing sales according to different years by clicking on one of the columns corresponding to a particular year, and then the chart will change to one showing sales for that year by month. An electronic graph can also include a link embedded in any visual feature, such as a bar chart column, which can be used to invoke other objects, such as another slide in a presentation.

SUMMARY OF THE INVENTION

The present invention in at least one embodiment is generally directed to the evaluation of results of an analysis performed by a cognitive system by generating a visualization of the results using a display device, the visualization including primary graphical elements representing confidence levels for the results, result labels proximate the primary graphical elements, and secondary graphical elements visually associated with a particular primary graphical element wherein the secondary graphical elements represent secondary data associated with a particular result corresponding to the particular primary graphical element, the secondary graphical elements being presented in the visualization in a condensed form where each secondary graphical element is only partially visible, then detecting that the particular primary graphical element has been selected, and responsively transitioning the visualization by moving the secondary graphical elements from the condensed form to an expanded form where each secondary graphical element is fully visible. The visualization can include a legend with a string pointer for a selected one of the result labels such that, when the particular primary graphical element has been selected, the legend displays a particular result label corresponding to the particular result. For the application wherein the analysis performed by the cognitive system is a response of the system to a natural language question, the plural results are candidate answers to the question, and the legend further includes the question. When the particular result label displayed in the legend has been selected, the visualization can be augmented to include explanatory information pertaining to the particular result. The explanatory information may be, e.g., evidence extracted from corpora used by the cognitive system to arrive at the particular result. The visualization can be a three-dimensional visualization where the primary graphical elements and result labels are presented on a front plane defining first and second axes, and the secondary graphical elements are presented along a third axis when in the condensed form, but are presented on the front plane when in the expanded form. In the illustrative implementation the visualization is a bar chart where the primary and second graphical elements are bars.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Traditional bar graphs are a great way of showing numerical values with height relations for a quick visual comparison. What they do not allow for is showing relevant secondary information tied to a single bar. Some graphics programs allow secondary information to be shown for every bar, but this approach leads to a very confusing and messy visualization depending on how many layers deep and wide the chart is. Furthermore, this approach may cause part of the visualization to become concealed due to obstructions from other bars or secondary data within the visualization. It would, therefore, be desirable to devise an improved method of presenting secondary data with a chart such as a bar chart which could foreshadow to the user a way to explore additional relevant information tied to a single bar without presenting excessive graphical features. It would be further advantageous if the method could show the user that there is other data available that might be useful to view but in the end leaves it up to user whether or not to view it.

The present invention addresses these goals by showing the most relevant data from a 3D bar graph on the front plane as primary bars while offering a slight hint of additional data being available along a third (depth) axis for one or more of the primary bars, referred to herein as swivel bars. The secondary data is shown only when the user brings the primary bar or other graphical feature into focus, i.e., the secondary data swivels from the background axis to a foreground axis, e.g., the horizontal axis, pivoting about the associated primary bar. The secondary data set can be brought forward to the front plane without creating obstructions of other data. This solution shows the user the most relevant data on the forefront and invites the user to see the secondary data if desired. The folding/unfolding technique of the present invention offers the secondary data sets in smaller chunks which is easier for the user to understand and digest instead of being presented with the whole 3-D data set in a messy visualization.

Figure 1:
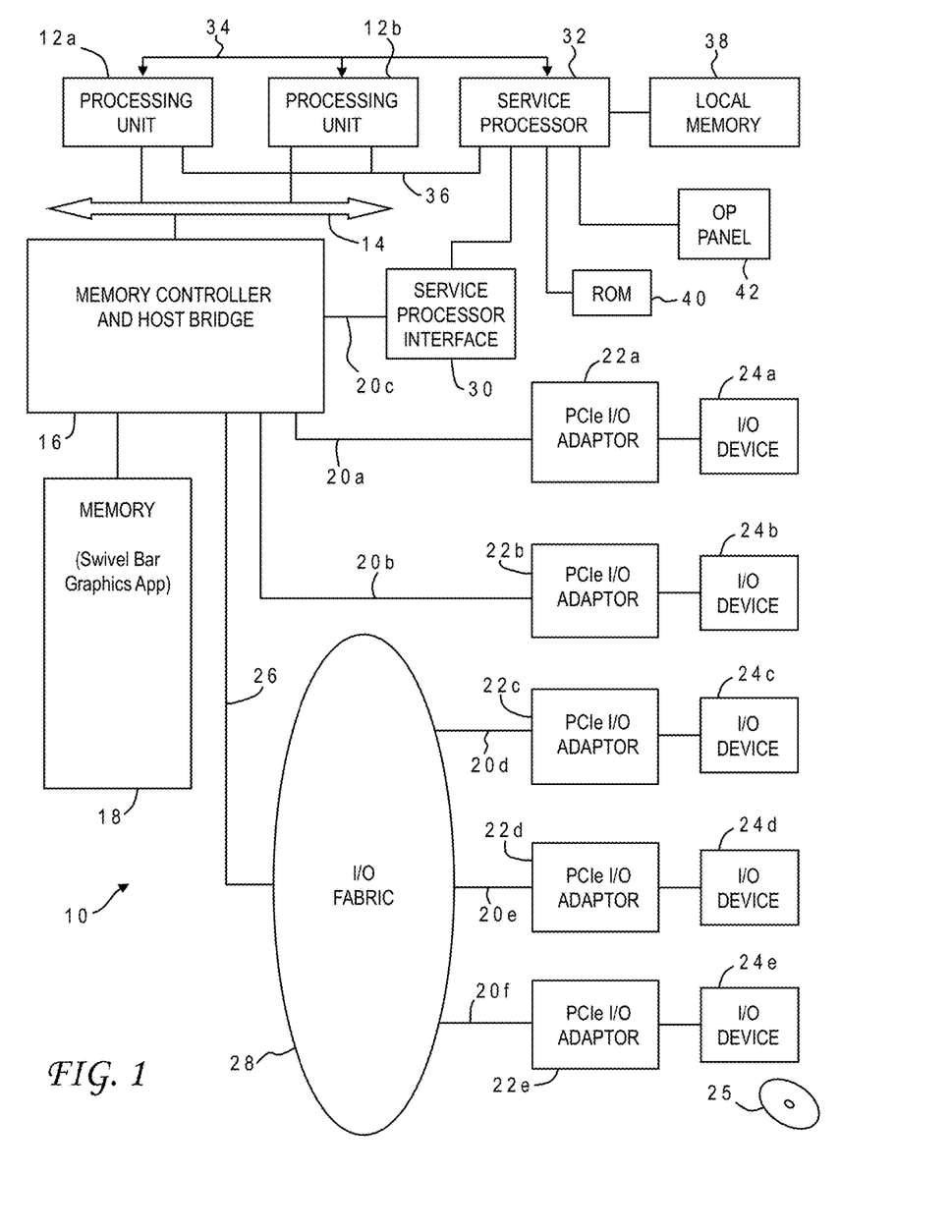
FIG. 1 is a block diagram of a computer system programmed to carry out graphics creation including charts such as bar charts in accordance with one implementation of the present invention.

With reference now to the figures, and in particular with reference to FIG. 1, there is depicted one embodiment 10 of a computer system in which the present invention may be implemented to create and interact with graphical presentations including but not limited to 3D bar charts. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein a graphics application which includes the swivel bar functionality of the present invention.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the graphics application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a graphical presentation process that uses novel imaging techniques to manage secondary data supporting a visualization. Accordingly, a program embodying the invention may include conventional aspects of various graphical presentation tools, and those details will become apparent to those skilled in the art upon reference to this disclosure.

Figure 2:
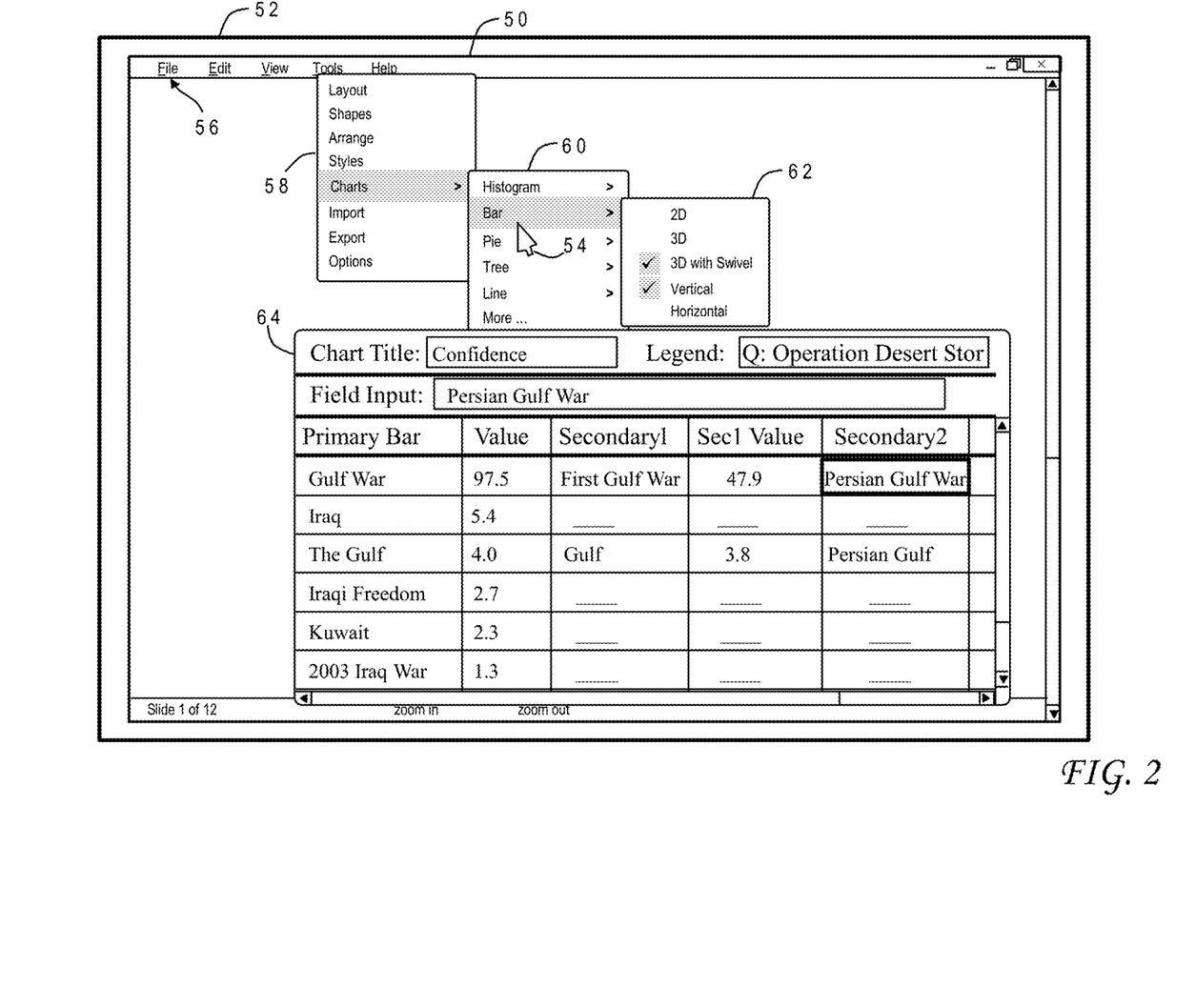
FIG. 2 is a screenshot of a user interface for a graphics package running on the computer system of FIG. 1 including a spreadsheet-type window or pane allowing a user to enter both primary data and secondary data associated with the primary data which is to be displayed as a swivel bar in a 3D bar chart in accordance with one implementation of the present invention.

Referring now to FIG. 2, there is depicted an example of a user interface 50 which may be used according to one implementation of the present invention to create and display graphical presentations having one or more graphs or charts, including bar charts. User interface 50 may be part of (generated by) the graphics package installed on computer system 10 and is seen on a screen or display device 52, such as a liquid crystal display, which may be one of the I/O devices 24 of computer system 10. This screen 52 may be the same as that used to display the graphs that are seen in the following FIGS. 3A-3D and 4. The user interface may be responsive to a visual pointer 54 controlled by a graphical pointing device, e.g., mouse. As with the discussion of computer system 10, the particular details of screen 52 and pointer 54 described herein should not be construed in a limiting sense as they are peripheral to the invention. For example, the user interface could be seen using an optical head-mounted display in the shape of eyeglasses with the pointer controlled by one or more touchpads located on the sides of the eyeglasses, or controlled via voice activation.

In this example user interface 50 has a menu bar 56 which includes five primary commands: "File", "Edit", "View", "Tools", and "Help". User interface 50 may have other menu-type features not shown such as a menu ribbon, tabs, buttons, etc. Clicking on one of the commands on menu bar 56 (using a mouse button or other activation method) can result in a drop-down menu 58 as seen with the "Tools" command. Drop-down menu 58 has eight items or rows, one of these being a "Charts" command which also has a right arrow symbol indicating that activating this command will open a further drop-down menu 60. Drop-down menu 60 has more commands for generating various types of charts, including a "Bar" command which can further be used to open an options menu 62. Options menu 62 uses pre-defined, adjustable templates to automatically generate various types of bar charts. The bar chart can be 2D, 3D, or 3D with swivel bars. It can also have vertical columns, or horizontal columns. Those skilled in the art will appreciate that other options may be applied to generating bar charts as well as other types of charts.

When the user selects the 3D with swivel bars option from options menu 62, user interface 50 responsively creates a window or pane 64 having various fields which allow the user to input the data that will be reflected in the bar chart. In this implementation window 64 has several unique fields such as a chart title and a chart legend, as well as multiple cells arranged in the manner of a spreadsheet for entering primary data (labels and corresponding data values for primary bars of the chart), and secondary data (labels and corresponding data values for secondary bars associated with certain primary bars). For this example the chart to be created pertains to an evaluation of the results of a cognitive analysis, specifically, a responsive answer to a natural language question submitted to a deep question answering system such as the Watson™ cognitive technology marketed by International Business Machines Corp. The user has entered a chart title of "Confidence" and a legend of "Q: Operation Desert Storm was the codename for what war?". The first primary bar label is "Gulf War" with a corresponding value of 97.5. This primary bar has secondary data associated with it, the first secondary bar label being "First Gulf War" with an associated value of 5.4. Other secondary bar labels and values associated with this first primary bar are not visible in FIG. 2 but are input by moving the focus of the spreadsheet to an adjacent cell by using arrow keys on the computer keyboard or using a scroll bar as part of window 64. The spreadsheet also shows other cells filled in for other primary bars including "Iraq" (value 5.4), "The Gulf" (value 4.0), "Iraqi Freedom" (value 2.7), "Kuwait" (value 2.3), and "2003 Iraq War" (value 1.3). Again, additional primary bars are not visible in FIG. 2 but are input by moving the focus of the spreadsheet to cells in lower rows.

User interface 50 is one way to allow a user to manually input the data required by the graphics program to generate a bar chart, but those skilled in the art will appreciate that many other methods and interfaces can be used. The required data may also be compiled automatically using customized programs or scripts to extract labels and data values from a particular system, such as the deep question answering system.

Figure 3A:
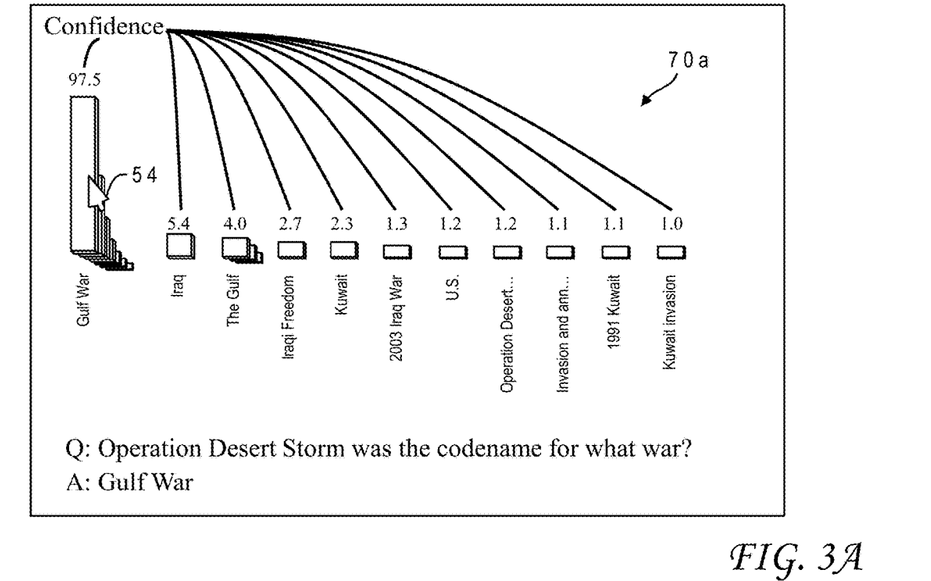
FIGS. 3A-3D are bar charts as seen on a display device illustrating how user interaction can bring secondary data associated with a primary bar to the forefront of the chart in accordance with one implementation of the present invention.

The result of the user input from FIG. 2 is the 3D swivel bar graph seen in FIGS. 3A-3D, generated by appropriate program instructions carried out by computer system 10 based on the user input. FIG. 3A shows an initial form 70a of the 3D swivel bar graph wherein no secondary data is directly shown, that is, the information relating to secondary data for any primary bars is partially hidden or compressed behind the corresponding primary bar. Further to this example, there are two primary bars (swivel bars) with secondary data: the first primary bar "Gulf War", and the third primary bar "The Gulf". Each of those two primary bars has other, shorter bars (blocks) trailing behind along the z-axis providing a 3D visual hint to the user that additional information is available for these two primary bars. Thus, the swivel bar can foreshadow to the user a way to explore additional relevant information associated with a single primary bar but without creating an interface that is too busy and confusing.

From the visual perspective of the three-dimensional aspect of the graphs seen in FIGS. 3A-3D, the depth direction is indicated by a skewed angle from the horizontal which has a slightly downward pitch (~30°). That is, a portion of a partially hidden secondary bar when in the compressed (condensed) state is still visible underneath the previous bar, i.e., they are overlapping. The overall width for the presentation of a condensed swivel bar is slightly larger than the width for a primary bar having no secondary data. However, these details are implementation-specific, and other graphs conforming to the present invention could use different perspectives and attributes. For example, instead of the bars or blocks viewed as sitting along a common floor plane, they could be hanging from a common ceiling plane in which case the pitch of secondary blocks along the z-axis could be upward. Those skilled in the art will thus appreciate that the invention is not limited to any particular graphical scheme, only that it allow the viewer to infer a third dimension in the graph. Similarly, the terms "vertical", "horizontal", "depth", "x-axis", "y-axis", and "z-axis" should not be construed in a limiting sense as these are relative terms dependent upon a particular perspective. Moreover, the three dimensions or axes of the graph need not be orthogonal. FIG. 3A can be considered a default or starting version for a 3D swivel bar graph since all secondary data is shown compressed, i.e., before any particular primary bar has been selected for inspection.

If a user wants to explore the secondary data of a swivel bar, that bar can be activated such as by clicking the mouse when pointer 54 is hovering over the swivel bar, as seen with the first swivel bar labeled "Gulf War" in FIG. 3A. Clicking on a swivel bar in this manner will bring the associated secondary data to the front plane as seen in the modified graph 70b of FIG. 3B. That is, the blocks or bars forming the secondary data are no longer seen along the depth axis, but rather are spread out along the horizontal axis, their bottoms aligned with the primary bars. In this expanded state they are fully visible. The graphics package running on computer system 10 can provide a moving animation that incrementally shows the secondary bars shifting position toward the final arrangement to make the transition between the two graphs 70a, 70b smoother. Labels for the secondary bars also become visible. In this case, the secondary bar labels associated with the first primary bar include "First Gulf War", "Persian Gulf War", "Iraq War", "Gulf War I", "The Persian Gulf War" (only partially rendered), and "The Gulf War". Only the secondary bars of the selected primary bar are swiveled to the forefront, i.e., secondary data for other primary bars is still compressed such as the secondary bars associated with the third primary bar labeled "The Gulf". This swiveling of the secondary data pushes the other primary bars to the side (in this implementation, to the right) to make room; this action may end up pushing some of the edge bars off the screen, i.e., removed from the graph.

FIGS. 3A-3D show an optional feature of the graphics package pertaining to the legend. The legend can have multiple fields corresponding to different rows or lines, with each line independent of the others. User interface 50 can allow the user to enter a string pointer (variable) as part of one of the lines. In the example of FIGS. 3A-3D, the second line is a variable that points to a label of a primary bar which is considered the current focus. The focus is set/detected based on activation of the primary bar, e.g., using the pointer 54. Thus, when the user clicks on the first primary bar the second line of the legend becomes "A: Gulf War"; when the user clicks on the second primary bar the second line of the legend becomes "A: Iraq" (see FIG. 3C); when the user clicks on the third primary bar the second line of the legend becomes "A: The Gulf" (see FIG. 3D), etc.

If the graph is showing secondary data in the foreground and one of the other primary bars is selected, then the secondary data currently being shown can be retracted. For example, if the screen is showing the modified graph 70b of FIG. 3B and the user selects the second primary bar labeled "Iraq" as indicated by pointer 54a, the screen will transition to the modified graph 70c of FIG. 3C wherein the secondary data for the first primary bar labeled "Gulf War" is again compressed. Although this automatic retraction of non-selected secondary data is deemed preferable for the aesthetics of a presentation, the invention could still allow the secondary data of a previously selected primary bar to remain in the foreground until that primary bar is explicitly deselected.

Figure 3B:
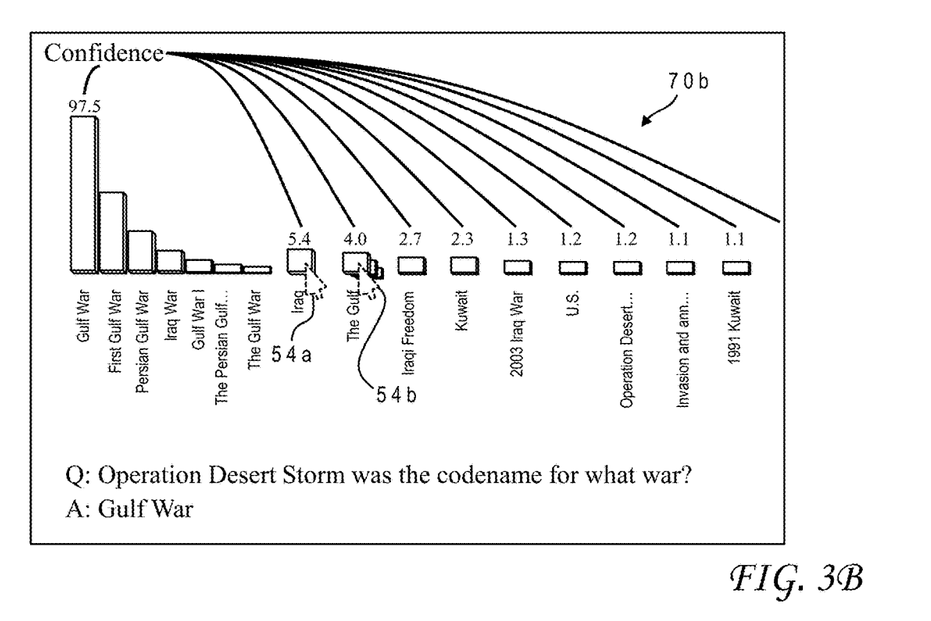
Figure 3C:
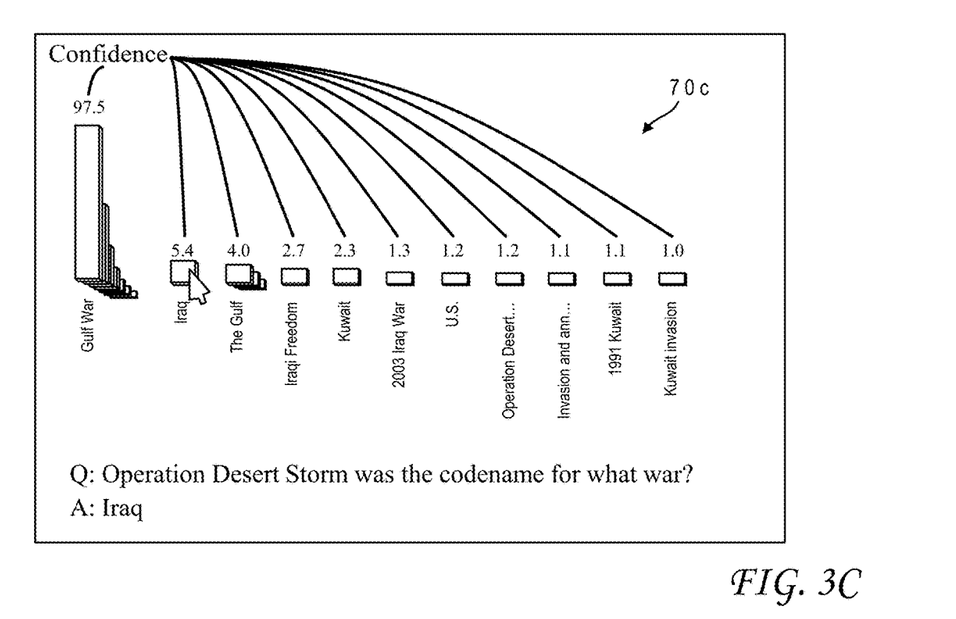
Figure 3D:
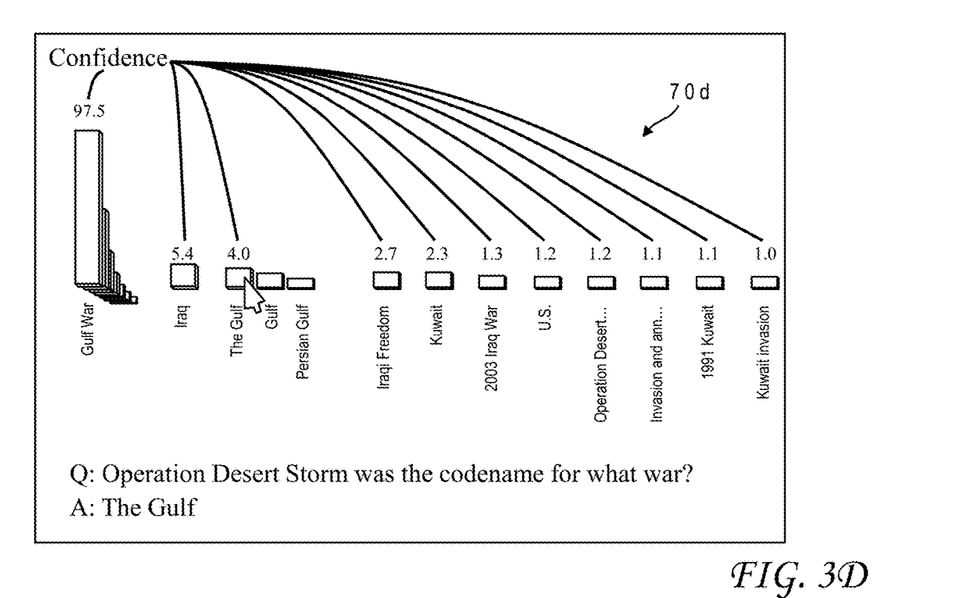

When the user selects another primary bar, if there is any secondary data associated with that bar it will now be moved to the forefront, but the second primary bar labeled "Iraq" has no associated secondary data so the only change in the graphic itself is the retraction. Thus modified graph 70c is the same as modified graph 70b except for the second line of the legend. However, when the user selects the third primary bar labeled "The Gulf" as indicated by pointer 54b in FIG. 3B, the associated secondary data is swiveled forward to the front plane as seen in the modified graph 70d of FIG. 3D. Again, labels for the secondary bars also become visible. In this case, the secondary bar labels associated with the third primary bar include "Gulf", and "Persian Gulf". In the examples of FIGS. 3B and 3D only the primary bars have height (quantitative value) indications, but the graphics program could be designed to also provide height indications for secondary bars.

The present invention can further be applied at multiple levels, i.e., a secondary bar can also be a swivel bar having its own associated (tertiary) data which is hidden until that secondary bar is selected.

It may be desirable for some applications to allow for even more information to be selectively displayed in conjunction with the bar chart. For example, in the application of evaluating a response from a cognitive system, it would be useful to provide explanatory information such as evidence from the system analysis which supports the particular answer being scrutinized. This example is illustrated in the bar chart 80 of FIG. 4. The question being considered is "What date is the Independence Day?" The cognitive system has arrived at multiple possible answers to this question, the top ten of which (according to confidence) are depicted in the chart: "National Day", "4 July", "Memorial Day", "1962", "5 December", "1 July", "June 12", "Tynwald Day", "18 April", and "Iyar". The first two primary bars are swivel bars, with the secondary data for the first primary bar shown at the forefront ("Australia Day", "Bastille Day").

These candidate answers were obtained from various lexical sources (corpora) such as text documents. Deep question answering systems can identify passages from extensive corpora and analyze them in various ways in order to extract answers relevant to a query; answers can be scored on a number of factors, and the highest score indicates the "best" answer according to the designer of the system. Models for scoring and ranking the answer can be trained on the basis of large sets of question and answer pairs. The answers (bar labels), confidence levels (bar values), and evidence are all provided by the cognitive system according to conventional means, and placed in a format which is readable by the graphics package running on computer system 10.

Figure 4:
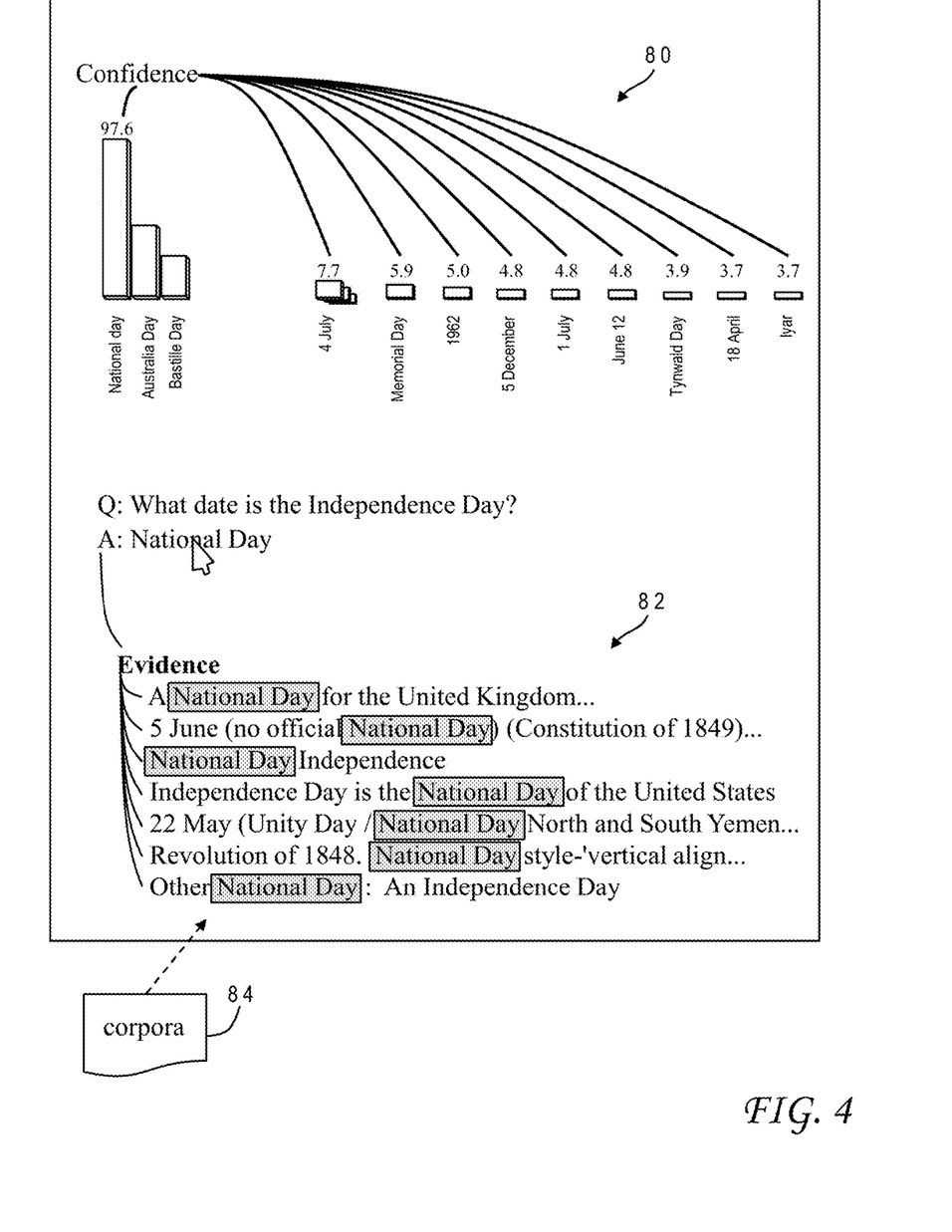
FIG. 4 is a bar chart as seen on a display device illustrating the swivel bar concept of the present invention along with explanatory information such as evidence supporting a cognitive analysis in accordance with one implementation of the present invention.

In this implementation of the invention, the evaluator can select a particular answer (whether in the legend below the graphic or one of the labels that are part of the graphic) to expose explanatory information pertaining to this term. The explanatory information for this application is evidence from the various corpora supporting the candidate answer.

As seen in FIG. 4, the answer provided by the cognitive system with the highest confidence is "National Day". However, the designer who is undertaking the evaluation of the cognitive system knows that the question was asked from a location in Foster City, Calif., so the answer most likely to be correct is the 4$^{th}$ of July (the second answer provided by the cognitive system, but with a much lower confidence). The designer accordingly digs into this answer by clicking on "National Day" in the legend of the chart, which causes the graphics program to augment the visualization by producing evidence 82 in the form of sentences, clauses and phrases from the corpora 84 with the relevant search term highlighted. In this case, the evidence is presented below the legend, i.e., at the bottom of the visual presentation.

As seen in FIG. 4, the evidence provides an indication that the phrase "National Day" is used in a wide variety of cultures around the world for an annual celebration relating to a country. Viewing this explanatory information, the evaluator understands that the term "National Day" is a generic equivalent to "Independence Day" in a global context, which is the source of the error since the geographical context should specifically have been America. This selective presentation of additional evidence keeps the clutter of the chart to a minimum until further elucidation is required.

Figure 5:
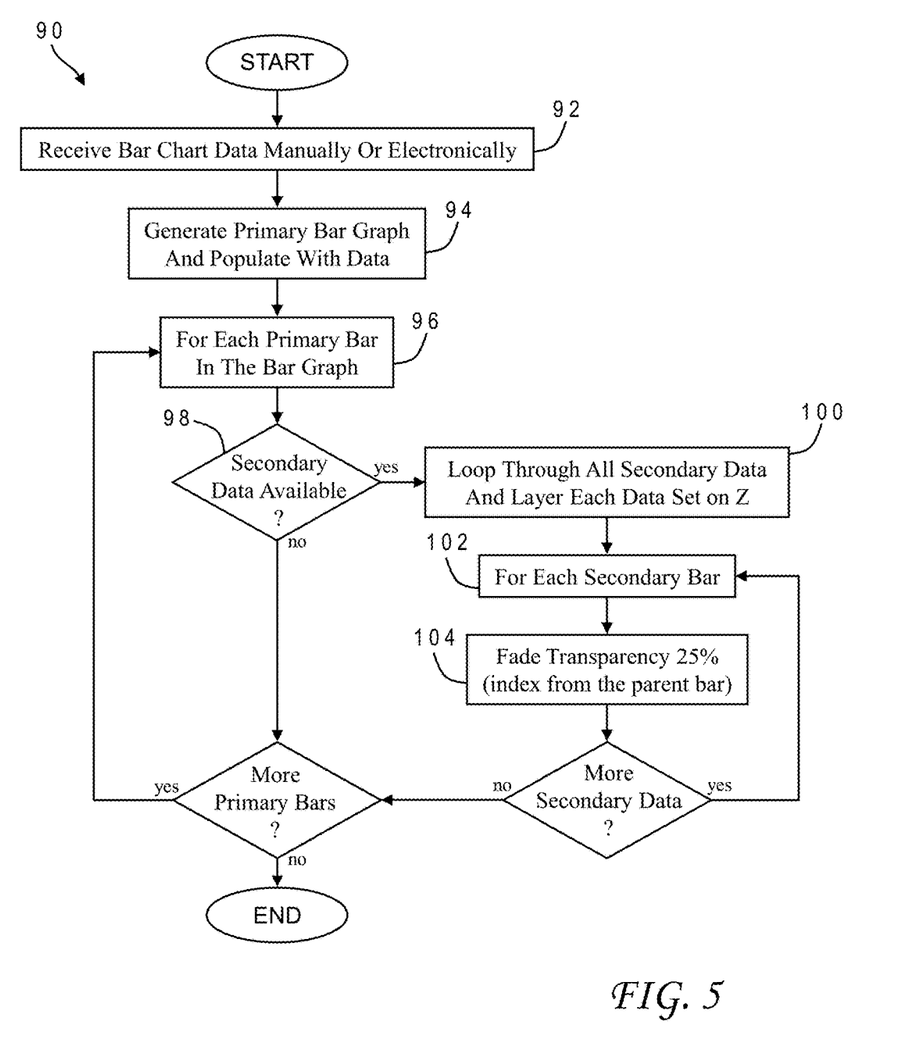
FIG. 5 is a chart illustrating the logical flow for swivel bar graph creation in accordance with one implementation of the present invention.

The present invention may be further understood with reference to the chart of FIG. 5 which illustrates the logical flow for a swivel bar graph creation process 90 in accordance with one implementation of the present invention which may be carried out by computer system 10. Process 90 begins by receiving the relevant data (92), e.g., as a computer-readable file provided electronically from the cognitive system, or manually provided through user interface 50. The graphics package running on computer system 10 generates the primary bar graph and populates the primary bars with their corresponding data values (94). A check is then made for each primary bar in the graph (96). If secondary data is available for the current primary bar (98), each secondary data set is visually layered on the graph along a depth axis compressed behind the corresponding primary bar (100). Each of these secondary bars is then considered (102). A transparency fade is applied to each bar at 25% increments from the parent bar (104), i.e., the first secondary bar will have a 25% transparency, the second secondary bar will have a 50% transparency, the third secondary bar will have a 75% transparency, and the fourth and subsequent bars will all be completely transparent (until brought into focus). Once all secondary data for a given primary bar is so layered and faded, the next primary bar is examined, and this process is repeated for each primary bar until all secondary data has been rendered. Other transparency increments can be used, e.g., 10% or 35%.

Figure 6:
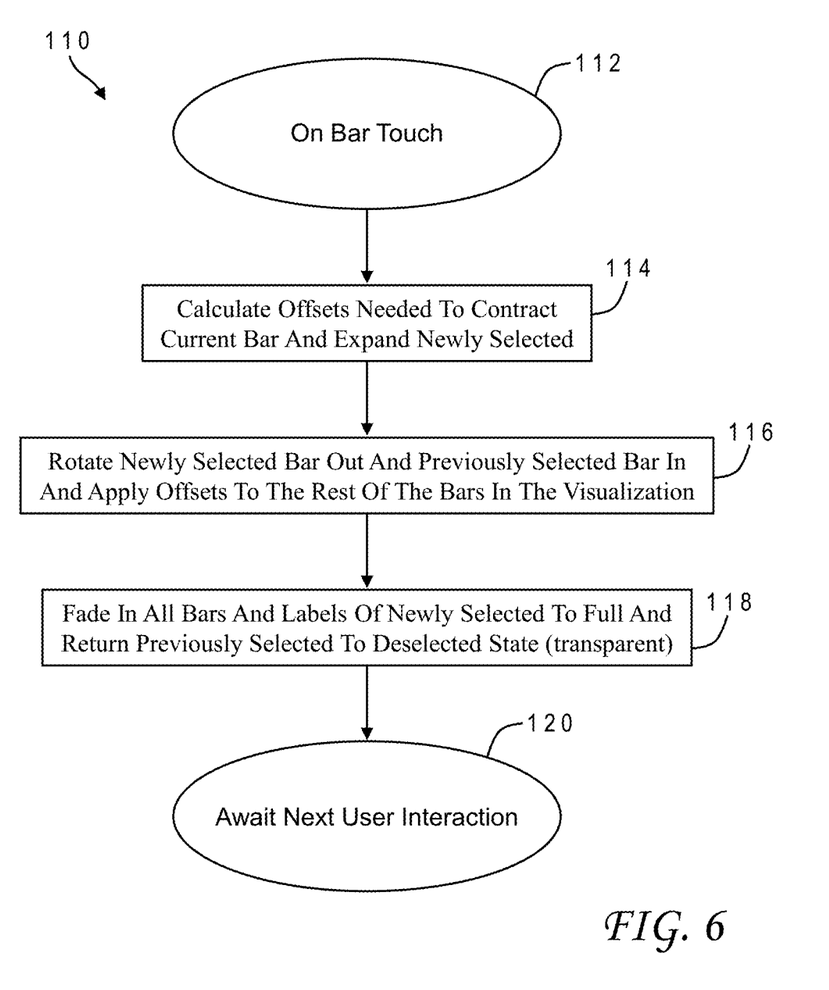
FIG. 6 is a chart illustrating the logical flow for swivel bar graph interaction in accordance with one implementation of the present invention.

FIG. 6 is a chart illustrating the logical flow for a swivel bar graph interaction process 110 in accordance with one implementation of the present invention which may also be carried out by computer system 10 after rendering the initial chart according to FIG. 5. Process 110 begins when a swivel bar on a displayed bar chart is selected, e.g., by clicking with a mouse (112). The graphics program responsively calculates the spacing (horizontal) offsets needed to contract any secondary data on another swivel bar which is currently the focus of the chart, and the spacing offsets needed to expand secondary data for the newly selected swivel bar (114). An animation is then performed where the newly selected swivel bar is rotated out (forward) and the previously selected swivel bar is rotated in (back), while applying the calculated offsets to shift the rest of the bars in the visualization (116). All secondary bars and secondary bar labels for the newly selected swivel bar fade in to full opacity and the previously selected secondary data is deselected, i.e., returned to transparency (118). The program then waits for the next user interaction (120), which may include activation of another swivel bar (returning to 112).

The present invention thereby provides a superior presentation allowing a user to easily realize that other notable information exists for certain features of the chart and can be brought forward in an intuitive manner. This approach keeps the core visualization cleaner, less distracting, and offers the data sets in smaller, controlled chunks instead of one big confusing data set.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention is applicable to any bar-type chart including histograms and is even usable with other types of charts as long as they can be rendered with a three-dimensional perspective. It is therefore contemplated that such modifications can be made without departing from the spirit or scope of the present invention as defined in the appended claims.

What is claimed is:

1. A method of evaluating plural results of an analysis performed by a cognitive system comprising:
generating a visualization of the plural results using a display device, the visualization including
a plurality of primary graphical elements representing confidence levels for the plural results,
result labels proximate the primary graphical elements, and
a plurality of secondary graphical elements visually associated with a particular one of the primary graphical elements wherein the secondary graphical elements represent secondary data associated with a particular one of the plural results corresponding to the particular primary graphical element, the secondary graphical elements being presented in the visualization in a condensed form where each secondary graphical element is only partially visible;
detecting that the particular primary graphical element has been selected; and
responsive to said detecting, transitioning the visualization by moving the secondary graphical elements from the condensed form to an expanded form where each secondary graphical element is fully visible.

2. The method of claim 1 wherein the visualization further includes a legend, and at least a portion of the legend is a string pointer for a selected one of the result labels such that, when the particular primary graphical element has been selected, the legend displays a particular result label corresponding to the particular result.

3. The method of claim 2 wherein the analysis performed by the cognitive system is a response of the system to a natural language question, the plural results being candidate answers to the question, and the legend further including the question.

4. The method of claim 2 further comprising:
second detecting that the particular result label displayed in the legend has been selected; and
responsive to said second detecting, augmenting the visualization to include explanatory information pertaining to the particular result.

5. The method of claim 4 wherein the explanatory information includes evidence extracted from corpora used by the cognitive system to arrive at the particular result.

6. The method of claim 1 wherein:
the visualization is a three-dimensional visualization;
the primary graphical elements and result labels are presented on a front plane of the three-dimensional visualization, the front plane defining first and second axes;
when in the condensed form, the secondary graphical elements are presented along a third axis of the three-dimensional visualization, the third axis being different from the first and second axes; and
when in the expanded form, the secondary graphical elements are presented on the front plane of the three-dimensional visualization.

7. The method of claim 6 wherein the visualization is a bar chart and the primary and second graphical elements are bars.

8. A computer system comprising:
one or more processors which process program instructions;
a display device;
a memory device connected to said one or more processors; and
program instructions residing in said memory device for evaluating plural results of an analysis performed by a cognitive system by generating a visualization of the plural results on the display device, the visualization including a plurality of primary graphical elements representing confidence levels for the plural results, result labels proximate the primary graphical elements, and a plurality of secondary graphical elements visually associated with a particular one of the primary graphical elements wherein the secondary graphical elements represent secondary data associated with a particular one of the plural results corresponding to the particular primary graphical element, the secondary graphical elements being presented in the visualization in a condensed form where each secondary graphical element is only partially visible, detecting that the particular primary graphical element has been selected, and transitioning the visualization by moving the secondary graphical elements to an expanded form where each secondary graphical element is fully visible.

9. The computer system of claim 8 wherein the visualization further includes a legend, and at least a portion of the legend is a string pointer for a selected one of the result labels such that, when the particular primary graphical element has been selected, the legend displays a particular result label corresponding to the particular result.

10. The computer system of claim 9 wherein the analysis performed by the cognitive system is a response of the system to a natural language question, the plural results being candidate answers to the question, and the legend further including the question.

11. The computer system of claim 9 wherein said program instructions further detect that the particular result label displayed in the legend has been selected, and augment the visualization to include explanatory information pertaining to the particular result.

12. The computer system of claim 8 wherein the explanatory information includes evidence extracted from corpora used by the cognitive system to arrive at the particular result.

13. The computer system of claim 8 wherein:
the visualization is a three-dimensional visualization;
the primary graphical elements and result labels are presented on a front plane of the three-dimensional visualization, the front plane defining first and second axes;
when in the condensed form, the secondary graphical elements are presented along a third axis of the three-dimensional visualization, the third axis being different from the first and second axes; and
when in the expanded form, the secondary graphical elements are presented on the front plane of the three-dimensional visualization.

14. The computer system of claim 8 wherein the visualization is a bar chart and the primary and second graphical elements are bars.

15. A computer program product comprising:
a computer readable storage medium; and
program instructions residing in said storage medium for evaluating plural results of an analysis performed by a cognitive system by generating a visualization of the plural results on a display device, the visualization including a plurality of primary graphical elements representing confidence levels for the plural results, result labels proximate the primary graphical elements, and a plurality of secondary graphical elements visually associated with a particular one of the primary graphical elements wherein the secondary graphical elements represent secondary data associated with a particular one of the plural results corresponding to the particular primary graphical element, the secondary graphical elements being presented in the visualization in a condensed form where each secondary graphical element is only partially visible, detecting that the particular primary graphical element has been selected, and transitioning the visualization by moving the secondary graphical elements to an expanded form where each secondary graphical element is fully visible.

16. The computer program product of claim 15 wherein the visualization further includes a legend, and at least a portion of the legend is a string pointer for a selected one of the result labels such that, when the particular primary graphical element has been selected, the legend displays a particular result label corresponding to the particular result.

17. The computer program product of claim 16 wherein the analysis performed by the cognitive system is a response of the system to a natural language question, the plural results being candidate answers to the question, and the legend further including the question.

18. The computer program product of claim 16 wherein said program instructions further detect that the particular result label displayed in the legend has been selected, and augment the visualization to include explanatory information pertaining to the particular result, the explanatory information including evidence extracted from corpora used by the cognitive system to arrive at the particular result.

19. The computer program product of claim 15 wherein:
the visualization is a three-dimensional visualization;
the primary graphical elements and result labels are presented on a front plane of the three-dimensional visualization, the front plane defining first and second axes;
when in the condensed form, the secondary graphical elements are presented along a third axis of the three-dimensional visualization, the third axis being different from the first and second axes; and when in the expanded form, the secondary graphical elements are presented on the front plane of the three-dimensional visualization.

20. The computer program product of claim 15 wherein the visualization is a bar chart and the primary and second graphical elements are bars.

* * * * *